(12) United States Patent
Raichelgauz et al.

(10) Patent No.: US 11,899,707 B2
(45) Date of Patent: Feb. 13, 2024

(54) DRIVING POLICIES DETERMINATION

(71) Applicant: Cortica Ltd.

(72) Inventors: Igal Raichelgauz, Tel Aviv (IL);
Karina Odinaev, Tel Aviv (IL);
Yehoshua Y Zeevi, Haifa (IL)

(73) Assignee: Cortica Ltd., Tel Aviv (IL)

( * ) Notice: Subject to any disclaimer, the term of this patent is extended or adjusted under 35 U.S.C. 154(b) by 589 days.

(21) Appl. No.: 16/628,744

(22) PCT Filed: Jul. 9, 2018

(86) PCT No.: PCT/IL2018/050746
§ 371 (c)(1),
(2) Date: Jan. 6, 2020

(87) PCT Pub. No.: WO2019/012527
PCT Pub. Date: Jan. 17, 2019

(65) Prior Publication Data
US 2020/0311117 A1 Oct. 1, 2020

Related U.S. Application Data

(60) Provisional application No. 62/530,215, filed on Jul. 9, 2017.

(51) Int. Cl.
*G06F 7/00* (2006.01)
*G06F 16/438* (2019.01)
*G06N 20/00* (2019.01)

(52) U.S. Cl.
CPC .......... *G06F 16/438* (2019.01); *G06N 20/00* (2019.01)

(58) Field of Classification Search
CPC ............. G06F 16/438; G06F 16/90328; G06F 16/5866; G06F 16/90335; G06F 16/24578; G06F 16/248; G06F 16/9535; G06N 20/00
See application file for complete search history.

(56) References Cited

U.S. PATENT DOCUMENTS

| | | |
|---|---|---|
| 4,733,353 A | 3/1988 | Jaswa |
| 4,932,645 A | 6/1990 | Schorey et al. |
| 4,972,363 A | 11/1990 | Nguyen et al. |
| 5,078,501 A | 1/1992 | Hekker et al. |
| 5,214,746 A | 5/1993 | Fogel et al. |

(Continued)

FOREIGN PATENT DOCUMENTS

| | | |
|---|---|---|
| EP | 1085464 A3 | 1/2007 |
| WO | 0231764 A2 | 4/2002 |

(Continued)

OTHER PUBLICATIONS

Zhou et al, "Ensembling neural networks: Many could be better than all", National Laboratory for Novel Software Technology, Nanjing University, Hankou Road 22, Nanjing 210093, PR China, Available online Mar. 12, 2002, pp. 239-263.

(Continued)

*Primary Examiner* — Mohammad A Sana
(74) *Attorney, Agent, or Firm* — Reches Patents (57) ABSTRACT

A method for responding to a query is implemented on at least one computing device and includes: receiving at least one query from a user device; determining a context for the at least one query, selecting at least one deep learning network (DLN) of a plurality of DLNs to process the at least one query, where the selecting is based at least on matching the context to the at least one DLN, sending at least a representation of the at least one query and the context to the at least one DLN, receiving at least one response to the at least one query from the at least one DLN, and sending the at least one response to the user device.

22 Claims, 3 Drawing Sheets

(56) References Cited

U.S. PATENT DOCUMENTS

| | | |
|---|---|---|
| 5,307,451 A | 4/1994 | Clark |
| 5,412,564 A | 5/1995 | Ecer |
| 5,436,653 A | 7/1995 | Ellis et al. |
| 5,568,181 A | 10/1996 | Greenwood et al. |
| 5,638,425 A | 6/1997 | Meador, I et al. |
| 5,745,678 A | 4/1998 | Herzberg et al. |
| 5,754,938 A | 5/1998 | Herz et al. |
| 5,763,069 A | 6/1998 | Jordan |
| 5,806,061 A | 9/1998 | Chaudhuri et al. |
| 5,835,087 A | 11/1998 | Herz et al. |
| 5,835,901 A | 11/1998 | Duvoisin et al. |
| 5,852,435 A | 12/1998 | Vigneaux et al. |
| 5,870,754 A | 2/1999 | Dimitrova et al. |
| 5,873,080 A | 2/1999 | Coden et al. |
| 5,887,193 A | 3/1999 | Takahashi et al. |
| 5,926,812 A | 7/1999 | Hilsenrath et al. |
| 5,978,754 A | 11/1999 | Kumano |
| 5,991,306 A | 11/1999 | Burns et al. |
| 6,052,481 A | 4/2000 | Grajski et al. |
| 6,070,167 A | 5/2000 | Qian et al. |
| 6,076,088 A | 6/2000 | Paik et al. |
| 6,122,628 A | 9/2000 | Castelli et al. |
| 6,128,651 A | 10/2000 | Cezar |
| 6,137,911 A | 10/2000 | Zhilyaev |
| 6,144,767 A | 11/2000 | Bottou et al. |
| 6,147,636 A | 11/2000 | Gershenson |
| 6,163,510 A | 12/2000 | Lee et al. |
| 6,243,375 B1 | 6/2001 | Speicher |
| 6,243,713 B1 | 6/2001 | Nelson et al. |
| 6,275,599 B1 | 8/2001 | Adler et al. |
| 6,314,419 B1 | 11/2001 | Faisal |
| 6,329,986 B1 | 12/2001 | Cheng |
| 6,381,656 B1 | 4/2002 | Shankman |
| 6,411,229 B2 | 6/2002 | Kobayashi |
| 6,422,617 B1 | 7/2002 | Fukumoto et al. |
| 6,507,672 B1 | 1/2003 | Watkins et al. |
| 6,523,046 B2 | 2/2003 | Liu et al. |
| 6,524,861 B1 | 2/2003 | Anderson |
| 6,546,405 B2 | 4/2003 | Gupta et al. |
| 6,550,018 B1 | 4/2003 | Abonamah et al. |
| 6,557,042 B1 | 4/2003 | He et al. |
| 6,594,699 B1 | 7/2003 | Sahai et al. |
| 6,601,026 B2 | 7/2003 | Appelt et al. |
| 6,611,628 B1 | 8/2003 | Sekiguchi et al. |
| 6,618,711 B1 | 9/2003 | Ananth |
| 6,640,015 B1 | 10/2003 | Lafruit |
| 6,643,620 B1 | 11/2003 | Contolini et al. |
| 6,643,643 B1 | 11/2003 | Lee et al. |
| 6,665,657 B1 | 12/2003 | Dibachi |
| 6,681,032 B2 | 1/2004 | Bortolussi et al. |
| 6,704,725 B1 | 3/2004 | Lee |
| 6,732,149 B1 | 5/2004 | Kephart |
| 6,742,094 B2 | 5/2004 | Igari |
| 6,751,363 B1 | 6/2004 | Natsev et al. |
| 6,751,613 B1 | 6/2004 | Lee et al. |
| 6,754,435 B2 | 6/2004 | Kim |
| 6,763,069 B1 | 7/2004 | Divakaran et al. |
| 6,763,519 B1 | 7/2004 | McColl et al. |
| 6,774,917 B1 | 8/2004 | Foote et al. |
| 6,795,818 B1 | 9/2004 | Lee |
| 6,804,356 B1 | 10/2004 | Krishnamachari |
| 6,813,395 B1 | 11/2004 | Kinjo |
| 6,819,797 B1 | 11/2004 | Smith et al. |
| 6,877,134 B1 | 4/2005 | Fuller et al. |
| 6,901,207 B1 | 5/2005 | Watkins |
| 6,938,025 B1 | 8/2005 | Lulich et al. |
| 6,985,172 B1 | 1/2006 | Rigney et al. |
| 7,013,051 B2 | 3/2006 | Sekiguchi et al. |
| 7,020,654 B1 | 3/2006 | Najmi |
| 7,023,979 B1 | 4/2006 | Wu et al. |
| 7,043,473 B1 | 5/2006 | Rassool et al. |
| 7,158,681 B2 | 1/2007 | Persiantsev |
| 7,215,828 B2 | 5/2007 | Luo |
| 7,260,564 B1 | 8/2007 | Lynn et al. |
| 7,289,643 B2 | 10/2007 | Brunk et al. |
| 7,299,261 B1 | 11/2007 | Oliver et al. |
| 7,302,089 B1 | 11/2007 | Smits |
| 7,302,117 B2 | 11/2007 | Sekiguchi et al. |
| 7,313,805 B1 | 12/2007 | Rosin et al. |
| 7,340,358 B2 | 3/2008 | Yoneyama |
| 7,346,629 B2 | 3/2008 | Kapur et al. |
| 7,353,224 B2 | 4/2008 | Chen et al. |
| 7,376,672 B2 | 5/2008 | Weare |
| 7,383,179 B2 | 6/2008 | Alves et al. |
| 7,433,895 B2 | 10/2008 | Li et al. |
| 7,464,086 B2 | 12/2008 | Black et al. |
| 7,529,659 B2 | 5/2009 | Wold |
| 7,657,100 B2 | 2/2010 | Gokturk et al. |
| 7,660,468 B2 | 2/2010 | Gokturk et al. |
| 7,801,893 B2 | 9/2010 | Gulli |
| 7,805,446 B2 | 9/2010 | Potok et al. |
| 7,860,895 B1 | 12/2010 | Scofield et al. |
| 7,872,669 B2 | 1/2011 | Darrell et al. |
| 7,921,288 B1 | 4/2011 | Hildebrand |
| 7,933,407 B2 | 4/2011 | Keidar et al. |
| 8,023,739 B2 | 9/2011 | Hohimer et al. |
| 8,266,185 B2 | 9/2012 | Raichelgauz et al. |
| 8,275,764 B2 | 9/2012 | Jeon |
| 8,285,718 B1 | 10/2012 | Ong et al. |
| 8,312,031 B2 | 11/2012 | Raichelgauz et al. |
| 8,315,442 B2 | 11/2012 | Gokturk et al. |
| 8,345,982 B2 | 1/2013 | Gokturk et al. |
| 8,386,400 B2 | 2/2013 | Raichelgauz et al. |
| 8,396,876 B2 | 3/2013 | Kennedy et al. |
| 8,418,206 B2 | 4/2013 | Bryant et al. |
| RE44,225 E | 5/2013 | Aviv |
| 8,442,321 B1 | 5/2013 | Chang et al. |
| 8,457,827 B1 | 6/2013 | Ferguson et al. |
| 8,495,489 B1 | 7/2013 | Everingham |
| 8,527,978 B1 | 9/2013 | Sallam |
| 8,634,980 B1 | 1/2014 | Urmson |
| 8,635,531 B2 | 1/2014 | Graham et al. |
| 8,655,801 B2 | 2/2014 | Raichelgauz et al. |
| 8,655,878 B1 | 2/2014 | Kulkarni et al. |
| 8,781,152 B2 | 7/2014 | Momeyer |
| 8,782,077 B1 | 7/2014 | Rowley |
| 8,799,195 B2 | 8/2014 | Raichelgauz et al. |
| 8,799,196 B2 | 8/2014 | Raichelquaz et al. |
| 8,818,916 B2 | 8/2014 | Raichelgauz et al. |
| 8,868,861 B2 | 10/2014 | Shimizu et al. |
| 8,886,648 B1 | 11/2014 | Procopio et al. |
| 8,954,887 B1 | 2/2015 | Tseng et al. |
| 8,990,199 B1 | 3/2015 | Ramesh et al. |
| 9,009,086 B2 | 4/2015 | Raichelgauz et al. |
| 9,104,747 B2 | 8/2015 | Raichelgauz et al. |
| 9,165,406 B1 | 10/2015 | Gray et al. |
| 9,298,763 B1 | 3/2016 | Zack |
| 9,311,308 B2 | 4/2016 | Sankarasubramaniam et al. |
| 9,323,754 B2 | 4/2016 | Ramanathan et al. |
| 9,440,647 B1 | 9/2016 | Sucan |
| 9,466,068 B2 | 10/2016 | Raichelgauz et al. |
| 9,646,006 B2 | 5/2017 | Raichelgauz et al. |
| 9,679,062 B2 | 6/2017 | Schillings et al. |
| 9,734,533 B1 | 8/2017 | Givot |
| 9,807,442 B2 | 10/2017 | Bhatia et al. |
| 9,875,445 B2 | 1/2018 | Amer et al. |
| 9,984,369 B2 | 5/2018 | Li et al. |
| 10,133,947 B2 | 11/2018 | Yang |
| 10,347,122 B2 | 7/2019 | Takenaka |
| 10,491,885 B1 | 11/2019 | Hicks |
| 2001/0019633 A1 | 9/2001 | Tenze et al. |
| 2001/0034219 A1 | 10/2001 | Hewitt et al. |
| 2001/0038876 A1 | 11/2001 | Anderson |
| 2002/0004743 A1 | 1/2002 | Kutaragi et al. |
| 2002/0010682 A1 | 1/2002 | Johnson |
| 2002/0010715 A1 | 1/2002 | Chinn et al. |
| 2002/0019881 A1 | 2/2002 | Bokhari et al. |
| 2002/0032677 A1 | 3/2002 | Morgenthaler et al. |
| 2002/0038299 A1 | 3/2002 | Zernik et al. |
| 2002/0042914 A1 | 4/2002 | Walker et al. |
| 2002/0072935 A1 | 6/2002 | Rowse et al. |
| 2002/0087530 A1 | 7/2002 | Smith et al. |
| 2002/0087828 A1 | 7/2002 | Arimilli et al. |
| 2002/0091947 A1 | 7/2002 | Nakamura |

(56) References Cited

U.S. PATENT DOCUMENTS

| | | |
|---|---|---|
| 2002/0107827 A1 | 8/2002 | Benitez-Jimenez et al. |
| 2002/0113812 A1 | 8/2002 | Walker et al. |
| 2002/0126002 A1 | 9/2002 | Patchell |
| 2002/0126872 A1 | 9/2002 | Brunk et al. |
| 2002/0129140 A1 | 9/2002 | Peled et al. |
| 2002/0147637 A1 | 10/2002 | Kraft et al. |
| 2002/0157116 A1 | 10/2002 | Jasinschi |
| 2002/0163532 A1 | 11/2002 | Thomas et al. |
| 2002/0174095 A1 | 11/2002 | Lulich et al. |
| 2002/0184505 A1 | 12/2002 | Mihcak et al. |
| 2003/0004966 A1 | 1/2003 | Bolle et al. |
| 2003/0005432 A1 | 1/2003 | Ellis et al. |
| 2003/0037010 A1 | 2/2003 | Schmelzer |
| 2003/0041047 A1 | 2/2003 | Chang et al. |
| 2003/0089216 A1 | 5/2003 | Birmingham et al. |
| 2003/0093790 A1 | 5/2003 | Logan et al. |
| 2003/0101150 A1 | 5/2003 | Agnihotri et al. |
| 2003/0105739 A1 | 6/2003 | Essafi et al. |
| 2003/0110236 A1 | 6/2003 | Yang et al. |
| 2003/0115191 A1 | 6/2003 | Copperman et al. |
| 2003/0126147 A1 | 7/2003 | Essafi et al. |
| 2003/0140257 A1 | 7/2003 | Peterka et al. |
| 2003/0158839 A1* | 8/2003 | Faybishenko ....... G06F 16/9535 707/E17.061 |
| 2003/0165269 A1 | 9/2003 | Fedorovskaya et al. |
| 2003/0174859 A1 | 9/2003 | Kim |
| 2003/0184598 A1 | 10/2003 | Graham |
| 2003/0200217 A1 | 10/2003 | Ackerman |
| 2003/0217335 A1 | 11/2003 | Chung et al. |
| 2003/0229531 A1 | 12/2003 | Heckerman et al. |
| 2004/0059736 A1 | 3/2004 | Willse |
| 2004/0091111 A1 | 5/2004 | Levy |
| 2004/0095376 A1 | 5/2004 | Graham et al. |
| 2004/0098671 A1 | 5/2004 | Graham et al. |
| 2004/0111432 A1 | 6/2004 | Adams et al. |
| 2004/0117638 A1 | 6/2004 | Monroe |
| 2004/0128511 A1 | 7/2004 | Sun et al. |
| 2004/0153426 A1 | 8/2004 | Nugent |
| 2004/0162820 A1 | 8/2004 | James et al. |
| 2004/0230572 A1 | 11/2004 | Omoigui |
| 2004/0267774 A1 | 12/2004 | Lin et al. |
| 2005/0021394 A1 | 1/2005 | Miedema et al. |
| 2005/0080788 A1 | 4/2005 | Murata |
| 2005/0114198 A1 | 5/2005 | Koningstein et al. |
| 2005/0131884 A1 | 6/2005 | Gross et al. |
| 2005/0163375 A1 | 7/2005 | Grady |
| 2005/0172130 A1 | 8/2005 | Roberts |
| 2005/0177372 A1 | 8/2005 | Wang et al. |
| 2005/0193015 A1 | 9/2005 | Logston |
| 2005/0226511 A1 | 10/2005 | Short |
| 2005/0238198 A1 | 10/2005 | Brown et al. |
| 2005/0238238 A1 | 10/2005 | Xu et al. |
| 2005/0249398 A1 | 11/2005 | Khamene et al. |
| 2005/0256820 A1 | 11/2005 | Dugan et al. |
| 2005/0262428 A1 | 11/2005 | Little et al. |
| 2005/0281439 A1 | 12/2005 | Lange |
| 2005/0289163 A1 | 12/2005 | Gordon et al. |
| 2005/0289590 A1 | 12/2005 | Cheok et al. |
| 2006/0004745 A1 | 1/2006 | Kuhn et al. |
| 2006/0015580 A1 | 1/2006 | Gabriel et al. |
| 2006/0020958 A1 | 1/2006 | Allamanche et al. |
| 2006/0033163 A1 | 2/2006 | Chen |
| 2006/0050993 A1 | 3/2006 | Stentiford |
| 2006/0069668 A1 | 3/2006 | Braddy et al. |
| 2006/0080311 A1 | 4/2006 | Potok et al. |
| 2006/0100987 A1 | 5/2006 | Leurs |
| 2006/0112035 A1 | 5/2006 | Cecchi et al. |
| 2006/0120626 A1 | 6/2006 | Perlmutter |
| 2006/0129822 A1 | 6/2006 | Snijder et al. |
| 2006/0217818 A1 | 9/2006 | Fujiwara |
| 2006/0217828 A1 | 9/2006 | Hicken |
| 2006/0218191 A1 | 9/2006 | Gopalakrishnan |
| 2006/0224529 A1 | 10/2006 | Kermani |
| 2006/0236343 A1 | 10/2006 | Chang |
| 2006/0242130 A1 | 10/2006 | Sadri et al. |
| 2006/0248558 A1 | 11/2006 | Barton et al. |
| 2006/0251338 A1 | 11/2006 | Gokturk et al. |
| 2006/0251339 A1 | 11/2006 | Gokturk |
| 2006/0253423 A1 | 11/2006 | McLane et al. |
| 2006/0288002 A1 | 12/2006 | Epstein et al. |
| 2007/0022374 A1 | 1/2007 | Huang et al. |
| 2007/0033170 A1 | 2/2007 | Sull et al. |
| 2007/0038614 A1 | 2/2007 | Guha |
| 2007/0042757 A1 | 2/2007 | Jung et al. |
| 2007/0061302 A1 | 3/2007 | Ramer et al. |
| 2007/0067304 A1 | 3/2007 | Ives |
| 2007/0074147 A1 | 3/2007 | Wold |
| 2007/0083611 A1 | 4/2007 | Farago et al. |
| 2007/0091106 A1 | 4/2007 | Moroney |
| 2007/0130159 A1 | 6/2007 | Gulli et al. |
| 2007/0136782 A1 | 6/2007 | Ramaswamy et al. |
| 2007/0156720 A1 | 7/2007 | Maren |
| 2007/0196013 A1 | 8/2007 | Li |
| 2007/0244902 A1 | 10/2007 | Seide et al. |
| 2007/0253594 A1 | 11/2007 | Lu et al. |
| 2007/0298152 A1 | 12/2007 | Baets |
| 2008/0049789 A1 | 2/2008 | Vedantham et al. |
| 2008/0072256 A1 | 3/2008 | Boicey et al. |
| 2008/0079729 A1 | 4/2008 | Brailovsky |
| 2008/0109433 A1 | 5/2008 | Rose |
| 2008/0152231 A1 | 6/2008 | Gokturk et al. |
| 2008/0159622 A1 | 7/2008 | Agnihotri et al. |
| 2008/0165861 A1 | 7/2008 | Wen et al. |
| 2008/0166020 A1 | 7/2008 | Kosaka |
| 2008/0201299 A1 | 8/2008 | Lehikoinen et al. |
| 2008/0201314 A1 | 8/2008 | Smith et al. |
| 2008/0201361 A1 | 8/2008 | Castro et al. |
| 2008/0228995 A1 | 9/2008 | Tan et al. |
| 2008/0237359 A1 | 10/2008 | Silverbrook et al. |
| 2008/0247543 A1 | 10/2008 | Mick et al. |
| 2008/0253737 A1 | 10/2008 | Kimura et al. |
| 2008/0263579 A1 | 10/2008 | Mears et al. |
| 2008/0270373 A1 | 10/2008 | Oostveen et al. |
| 2008/0270569 A1 | 10/2008 | McBride |
| 2008/0294278 A1 | 11/2008 | Borgeson et al. |
| 2008/0307454 A1 | 12/2008 | Ahanger et al. |
| 2008/0313140 A1 | 12/2008 | Pereira et al. |
| 2009/0022472 A1 | 1/2009 | Bronstein |
| 2009/0024641 A1 | 1/2009 | Quigley et al. |
| 2009/0034791 A1 | 2/2009 | Doretto |
| 2009/0037088 A1 | 2/2009 | Taguchi |
| 2009/0043637 A1 | 2/2009 | Eder |
| 2009/0043818 A1 | 2/2009 | Raichelgauz |
| 2009/0080759 A1 | 3/2009 | Bhaskar |
| 2009/0096634 A1 | 4/2009 | Emam et al. |
| 2009/0125544 A1 | 5/2009 | Brindley |
| 2009/0157575 A1 | 6/2009 | Schobben et al. |
| 2009/0165031 A1 | 6/2009 | Li et al. |
| 2009/0172030 A1 | 7/2009 | Schiff et al. |
| 2009/0208106 A1 | 8/2009 | Dunlop et al. |
| 2009/0208118 A1 | 8/2009 | Csurka |
| 2009/0216761 A1 | 8/2009 | Raichelgauz et al. |
| 2009/0220138 A1 | 9/2009 | Zhang et al. |
| 2009/0245573 A1 | 10/2009 | Saptharishi et al. |
| 2009/0254572 A1 | 10/2009 | Redlich et al. |
| 2009/0278934 A1 | 11/2009 | Ecker |
| 2009/0282218 A1 | 11/2009 | Raichelgauz et al. |
| 2009/0297048 A1 | 12/2009 | Slotine et al. |
| 2010/0042646 A1 | 2/2010 | Raichelgauz et al. |
| 2010/0082684 A1 | 4/2010 | Churchill et al. |
| 2010/0104184 A1 | 4/2010 | Bronstein et al. |
| 2010/0111408 A1 | 5/2010 | Matsuhira |
| 2010/0125569 A1 | 5/2010 | Nair et al. |
| 2010/0162405 A1 | 6/2010 | Cook et al. |
| 2010/0191391 A1 | 7/2010 | Zeng |
| 2010/0198626 A1 | 8/2010 | Cho et al. |
| 2010/0212015 A1 | 8/2010 | Jin et al. |
| 2010/0284604 A1 | 11/2010 | Chrysanthakopoulos |
| 2010/0293057 A1 | 11/2010 | Haveliwala |
| 2010/0306193 A1 | 12/2010 | Pereira |
| 2010/0312736 A1 | 12/2010 | Kello |
| 2010/0318493 A1 | 12/2010 | Wessling |
| 2010/0325138 A1 | 12/2010 | Lee et al. |
| 2010/0325581 A1 | 12/2010 | Finkelstein et al. |

(56) References Cited

U.S. PATENT DOCUMENTS

| | | |
|---|---|---|
| 2011/0029620 A1 | 2/2011 | Bonforte |
| 2011/0035373 A1 | 2/2011 | Berg et al. |
| 2011/0038545 A1 | 2/2011 | Bober |
| 2011/0055585 A1 | 3/2011 | Lee |
| 2011/0164180 A1 | 7/2011 | Lee |
| 2011/0164810 A1 | 7/2011 | Zang et al. |
| 2011/0216209 A1 | 9/2011 | Fredlund et al. |
| 2011/0218946 A1 | 9/2011 | Stern et al. |
| 2011/0246566 A1 | 10/2011 | Kashef |
| 2011/0276680 A1 | 11/2011 | Rimon |
| 2011/0296315 A1 | 12/2011 | Lin et al. |
| 2012/0131454 A1 | 5/2012 | Shah |
| 2012/0133497 A1 | 5/2012 | Sasaki |
| 2012/0136853 A1 | 5/2012 | Kennedy et al. |
| 2012/0167133 A1 | 6/2012 | Carroll et al. |
| 2012/0179642 A1 | 7/2012 | Sweeney et al. |
| 2012/0179751 A1 | 7/2012 | Ahn |
| 2012/0185445 A1 | 7/2012 | Borden et al. |
| 2012/0207346 A1 | 8/2012 | Kohli et al. |
| 2012/0221470 A1 | 8/2012 | Lyon |
| 2012/0227074 A1 | 9/2012 | Hill et al. |
| 2012/0239690 A1 | 9/2012 | Asikainen et al. |
| 2012/0239694 A1 | 9/2012 | Avner et al. |
| 2012/0265735 A1 | 10/2012 | McMillan et al. |
| 2012/0294514 A1 | 11/2012 | Saunders et al. |
| 2012/0299961 A1 | 11/2012 | Ramkumar et al. |
| 2012/0301105 A1 | 11/2012 | Rehg et al. |
| 2012/0331011 A1 | 12/2012 | Raichelgauz et al. |
| 2013/0043990 A1 | 2/2013 | Al-Jafar |
| 2013/0066856 A1 | 3/2013 | Ong et al. |
| 2013/0067364 A1 | 3/2013 | Berntson et al. |
| 2013/0086499 A1 | 4/2013 | Dyor et al. |
| 2013/0089248 A1 | 4/2013 | Remiszewski et al. |
| 2013/0103814 A1 | 4/2013 | Carrasco |
| 2013/0151522 A1 | 6/2013 | Aggarwal et al. |
| 2013/0159298 A1 | 6/2013 | Mason et al. |
| 2013/0212493 A1 | 8/2013 | Krishnamurthy |
| 2013/0226820 A1 | 8/2013 | Sedota, Jr. |
| 2013/0226930 A1 | 8/2013 | Amgren et al. |
| 2013/0227023 A1 | 8/2013 | Raichelgauz et al. |
| 2013/0283401 A1 | 10/2013 | Pabla et al. |
| 2013/0346412 A1 | 12/2013 | Raichelgauz et al. |
| 2014/0019264 A1 | 1/2014 | Wachman et al. |
| 2014/0025692 A1 | 1/2014 | Pappas |
| 2014/0059443 A1 | 2/2014 | Tabe |
| 2014/0095425 A1 | 4/2014 | Sipple |
| 2014/0111647 A1 | 4/2014 | Atsmon |
| 2014/0125703 A1 | 5/2014 | Roveta et al. |
| 2014/0147829 A1 | 5/2014 | Jerauld |
| 2014/0149918 A1 | 5/2014 | Asokan et al. |
| 2014/0152698 A1 | 6/2014 | Kim et al. |
| 2014/0156691 A1 | 6/2014 | Conwell |
| 2014/0169681 A1 | 6/2014 | Drake |
| 2014/0176604 A1 | 6/2014 | Venkitaraman et al. |
| 2014/0193077 A1 | 7/2014 | Shiiyama et al. |
| 2014/0198986 A1 | 7/2014 | Marchesotti |
| 2014/0201330 A1 | 7/2014 | Lopez et al. |
| 2014/0250032 A1 | 9/2014 | Huang et al. |
| 2014/0282655 A1 | 9/2014 | Roberts |
| 2014/0300722 A1 | 10/2014 | Garcia |
| 2014/0330830 A1 | 11/2014 | Raichelgauz et al. |
| 2014/0341476 A1 | 11/2014 | Kulick et al. |
| 2014/0363044 A1 | 12/2014 | Williams et al. |
| 2014/0379477 A1 | 12/2014 | Sheinfeld |
| 2015/0033150 A1 | 1/2015 | Lee |
| 2015/0052089 A1 | 2/2015 | Kozloski et al. |
| 2015/0100562 A1 | 4/2015 | Kohlmeier et al. |
| 2015/0117784 A1 | 4/2015 | Lin et al. |
| 2015/0120627 A1 | 4/2015 | Hunzinger et al. |
| 2015/0127516 A1 | 5/2015 | Studnitzer et al. |
| 2015/0134688 A1 | 5/2015 | Jing |
| 2015/0248586 A1 | 9/2015 | Gaidon et al. |
| 2015/0254344 A1 | 9/2015 | Kulkarni et al. |
| 2015/0286742 A1 | 10/2015 | Zhang et al. |
| 2015/0286872 A1 | 10/2015 | Medioni et al. |
| 2015/0293976 A1* | 10/2015 | Guo .................. G06F 16/24578 |
| | | 707/706 |
| 2015/0324356 A1 | 11/2015 | Gutierrez et al. |
| 2015/0332588 A1 | 11/2015 | Bulan et al. |
| 2015/0363644 A1 | 12/2015 | Wnuk |
| 2016/0007083 A1 | 1/2016 | Gurha |
| 2016/0026707 A1 | 1/2016 | Ong et al. |
| 2016/0132194 A1 | 5/2016 | Grue et al. |
| 2016/0210525 A1 | 7/2016 | Yang |
| 2016/0221592 A1 | 8/2016 | Puttagunta et al. |
| 2016/0275766 A1 | 9/2016 | Venetianer et al. |
| 2016/0306798 A1 | 10/2016 | Guo et al. |
| 2016/0342683 A1 | 11/2016 | Kwon |
| 2016/0357188 A1 | 12/2016 | Ansari |
| 2017/0017638 A1 | 1/2017 | Satyavarta et al. |
| 2017/0032257 A1 | 2/2017 | Sharifi |
| 2017/0041254 A1 | 2/2017 | Agara Venkatesha Rao |
| 2017/0109602 A1 | 4/2017 | Kim |
| 2017/0154241 A1 | 6/2017 | Shambik et al. |
| 2017/0255620 A1 | 9/2017 | Raichelgauz |
| 2017/0262437 A1 | 9/2017 | Raichelgauz |
| 2017/0323568 A1 | 11/2017 | Inoue |
| 2017/0371898 A1* | 12/2017 | Sharma .................. G06V 20/20 |
| 2018/0081368 A1 | 3/2018 | Watanabe |
| 2018/0101177 A1 | 4/2018 | Cohen |
| 2018/0108258 A1 | 4/2018 | Dilger |
| 2018/0157903 A1 | 6/2018 | Tu et al. |
| 2018/0157916 A1 | 6/2018 | Doumbouya |
| 2018/0158323 A1 | 6/2018 | Takenaka |
| 2018/0189613 A1 | 7/2018 | Wolf et al. |
| 2018/0204111 A1 | 7/2018 | Zadeh |
| 2018/0373929 A1 | 12/2018 | Ye |
| 2019/0005726 A1 | 1/2019 | Nakano |
| 2019/0039627 A1 | 2/2019 | Yamamoto |
| 2019/0043274 A1 | 2/2019 | Hayakawa |
| 2019/0045244 A1 | 2/2019 | Balakrishnan |
| 2019/0056718 A1 | 2/2019 | Satou |
| 2019/0065951 A1 | 2/2019 | Luo |
| 2019/0096135 A1 | 3/2019 | Mutto et al. |
| 2019/0171912 A1 | 6/2019 | Vallespi-Gonzalez et al. |
| 2019/0188501 A1 | 6/2019 | Ryu |
| 2019/0220011 A1 | 7/2019 | Della Penna |
| 2019/0279046 A1 | 9/2019 | Han et al. |
| 2019/0304102 A1 | 10/2019 | Chen et al. |
| 2019/0317513 A1 | 10/2019 | Zhang |
| 2019/0364492 A1 | 11/2019 | Azizi |
| 2019/0384303 A1 | 12/2019 | Muller |
| 2019/0384312 A1 | 12/2019 | Herbach |
| 2019/0385460 A1 | 12/2019 | Magzimof |
| 2019/0389459 A1 | 12/2019 | Berntorp |
| 2020/0004248 A1 | 1/2020 | Healey |
| 2020/0004251 A1 | 1/2020 | Zhu |
| 2020/0004265 A1 | 1/2020 | Zhu |
| 2020/0005631 A1 | 1/2020 | Visintainer |
| 2020/0018606 A1 | 1/2020 | Wolcott |
| 2020/0018618 A1 | 1/2020 | Ozog |
| 2020/0020212 A1 | 1/2020 | Song |
| 2020/0050973 A1 | 2/2020 | Stenneth |
| 2020/0073977 A1 | 3/2020 | Montemerlo |
| 2020/0090484 A1 | 3/2020 | Chen |
| 2020/0097756 A1 | 3/2020 | Hashimoto |
| 2020/0133307 A1 | 4/2020 | Kelkar |
| 2020/0043326 A1 | 6/2020 | Tao |

FOREIGN PATENT DOCUMENTS

| | | |
|---|---|---|
| WO | 2003067467 A1 | 8/2003 |
| WO | 2005027457 A1 | 3/2005 |
| WO | 2007049282 A2 | 5/2007 |
| WO | 2014076002 A1 | 5/2014 |
| WO | 2014137337 A1 | 9/2014 |
| WO | 2016040376 A1 | 3/2016 |
| WO | 2016070193 A1 | 5/2016 |

OTHER PUBLICATIONS

Zhou et al, "Medical Diagnosis With C4.5 Rule Preceded by Artificial Neural Network Ensemble", IEEE Transactions on Infor- (56) References Cited

OTHER PUBLICATIONS mation Technology in Biomedicine, vol. 7, Issue: 1, Mar. 2003, pp. 37-42.
Zhu et al., "Technology-Assisted Dietary Assesment", Proc SPIE. Mar. 20, 2008, pp. 1-15.
Zou et al., "A Content-Based Image Authentication System with Lossless Data Hiding", ICME 2003, pp. 213-216.
Jasinschi et al., A Probabilistic Layered Framework for Integrating Multimedia Content and Context Information, 2002, IEEE, p. 2057-2060. (Year: 2002).
Jones et al., "Contextual Dynamics of Group-Based Sharing Decisions", 2011, University of Bath, p. 1777-1786. (Year: 2011).
Iwamoto, "Image Signature Robust to Caption Superimpostion for Video Sequence Identification", IEEE, pp. 3185-3188 (Year: 2006).
Cooperative Multi-Scale Convolutional Neural, Networks for Person Detection, Markus Eisenbach, Daniel Seichter, Tim Wengefeld, and Horst-Michael Gross Ilmenau University of Technology, Neuroinformatics and Cognitive Robotics Lab (Year; 2016).
Chen, Yixin, James Ze Wang, and Robert Krovetz. "CLUE: cluster-based retrieval of images by unsupervised learning." IEEE transactions on Image Processing 14.8 (2005); 1187-1201. (Year: 2005).
Wusk et al (Non-Invasive detection of Respiration and Heart Rate with a Vehicle Seat Sensor; www.mdpi.com/journal/sensors; Published: May 8, 2018). (Year: 2018).
Chen, Tiffany Yu-Han, et al. "Glimpse: Continuous, real-time object recognition on mobile devices." Proceedings of the 13th ACM Confrecene on Embedded Networked Sensor Systems. 2015. (Year: 2015).
"Computer Vision Demonstration Website", Electronics and Computer Science, University of Southampton, 2005, USA.
Big Bang Theory Series 04 Episode 12, aired Jan. 6, 2011; [retrieved from Internet: ].
Boari et al, "Adaptive Routing for Dynamic Applications in Massively Parallel Architectures", 1995 IEEE, Spring 1995, pp. 1-14.
Burgsteiner et al., "Movement Prediction from Real-World Images Using a Liquid State machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.
Cernansky et al, "Feed-forward Echo State Networks", Proceedings of International Joint Conference on Neural Networks, Montreal, Canada, Jul. 31-Aug. 4, 2005, pp. 1-4.
Chinchor, Nancy A. et al.; Multimedia Analysis + Visual Analytics = Multimedia Analytics; IEEE Computer Society; 2010; pp. 52-60. (Year: 2010).
Fathy et al, "A Parallel Design and Implementation For Backpropagation Neural Network Using MIMD Architecture", 8th Mediterranean Electrotechnical Conference, 19'96. MELECON '96, Date of Conference: May 13-16, 1996, vol. 3 pp. 1472-1475, vol. 3.
Freisleben et al., "Recognition of Fractal Images Using a Neural Network", Lecture Notes in Computer Science, 1993, vol. 6861, 1993, pp. 631-637.
Garcia, "Solving the Weighted Region Least Cost Path Problem Using Transputers", Naval Postgraduate School, Monterey, California, Dec. 1989.
Guo et al, AdOn: An Intelligent Overlay Video Advertising System (Year: 2009).
Hogue, "Tree Pattern Inference and Matching for Wrapper Induction on the World Wide Web", Master's Thesis, Massachusetts Institute of Technology, Jun. 2004, pp. 1-106.
Hua et al., "Robust Video Signature Based on Ordinal Measure", Image Processing, 2004, 2004 International Conference on Image Processing (ICIP), vol. 1, IEEE, pp. 685-688, 2004.
International Search Report and Written Opinion for PCT/US2016/050471, ISA/RU, Moscow, RU, dated May 4, 2017.
International Search Report and Written Opinion for PCT/US2016/054634, ISA/RU, Moscow, RU, dated Mar. 16, 2017.
International Search Report and Written Opinion for PCT/US2017/015831, ISA/RU, Moscow, RU, dated Apr. 20, 2017.
Johnson et al, "Pulse-Coupled Neural Nets: Translation, Rotation, Scale, Distortion, and Intensity Signal Invariance for Images", Applied Optics, vol. 33, No. 26, 1994, pp. 6239-6253.
Lau et al., "Semantic Web Service Adaptation Model for a Pervasive Learning Scenario", 2008 IEEE Conference on Innovative Technologies in Intelligent Systems and Industrial Applications, 2008, pp. 98-103.
Li et al ("Matching Commercial Clips from TV Streams Using a Unique, Robust and Compact Signature" 2005) (Year: 2005).
Lin et al., "Generating robust digital signature for image/video authentication", Multimedia and Security Workshop at ACM Multimedia '98, Bristol, U.K., Sep. 1998, pp. 245-251.
Lu et al, "Structural Digital Signature for Image Authentication: An Incidental Distortion Resistant Scheme", IEEE Transactions on Multimedia, vol. 5, No. 2, Jun. 2003, pp. 161-173.
Lyon, "Computational Models of Neural Auditory Processing", IEEE International Conference on Acoustics, Speech, and Signal Processing, ICASSP '84, Date of Conference: Mar. 1984, vol. 9, pp. 41-44.
Ma Et El "Semantics modeling based image retrieval system using neural networks", 2005.
Marian Stewart B et al., "Independent component representations for face recognition", Proceedings of the SPIE Symposium on Electronic Imaging: Science and Technology; Conference on Human Vision and Electronic Imaging III, San Jose, California, Jan. 1998, pp. 1-12.
May et al, "The Transputer", Springer-Verlag Berlin Heidelberg 1989, vol. 41.
Mcnamara et al., "Diversity Decay in opportunistic Content Sharing Systems", 2011 IEEE International Symposium on a World of Wireless, Mobile and Multimedia Networks, pp. 1-3.
Morad et al., "Performance, Power Efficiency and Scalability of Asymmetric Cluster Chip Multiprocessors", Computer Architecture Letters, vol. 4, Jul. 4, 2005, pp. 1-4, XP002466254.
Nagy et al, "A Transputer, Based, Flexible, Real-Time Control System for Robotic Manipulators", UKACC International Conference on Control '96, Sep. 2-5, 1996, Conference Publication No. 427, IEE 1996.
Natschlager et al., "The "Liquid Computer": A novel strategy for real-time computing on time series", Special Issue on Foundations of Information Processing of telematik, vol. 8, No. 1, 2002, pp. 39-43, XP002466253.
Odinaev et al, "Cliques in Neural Ensembles as Perception Carriers", Technion—Institute of Technology, 2006 International Joint Conference on neural Networks, Canada, 2006, pp. 285-292.
Ortiz-Boyer et al., "CIXL2: A Crossover Operator for Evolutionary Algorithms Based on Population Features", Journal of Artificial Intelligence Research 24 (2005) Submitted Nov. 2004; published Jul. 2005, pp. 1-48.
Pandya etal. A Survey on QR Codes: in context of Research and Application. International Journal of Emerging Technology and U Advanced Engineering. ISSN 2250-2459, ISO 9001:2008 Certified Journal, vol. 4, Issue 3, Mar. 2014 (Year: 2014).
Queluz, "Content-Based Integrity Protection of Digital Images", SPIE Conf. on Security and Watermarking of Multimedia Contents, San Jose, Jan. 1999, pp. 85-93.
Rui, Yong et al. "Relevance feedback: a power tool for interactive content-based image retrieval." IEEE Transactions on circuits and systems for video technology 8.5 (1998): 644-655.
Santos et al., "SCORM-MPEG: an Ontology of Interoperable Metadata for multimediaand E-Learning", 23rd International Conference on Software, Telecommunications and Computer Networks (SoftCom), 2015, pp. 224-228.
Scheper et al, "Nonlinear dynamics in neural computation", ESANN'2006 proceedings—European Symposium on Artificial Neural Networks, Bruges (Belgium), Apr. 26-28, 2006, d-side publication, ISBN 2-930307-06-4, pp. 1-12.
Schneider et al, "A Robust Content based Digital Signature for Image Authentication", Proc. ICIP 1996, Lausane, Switzerland, Oct. 1996, pp. 227-230.
Srihari et al., "Intelligent Indexing and Semantic Retrieval of Multimodal Documents", Kluwer Academic Publishers, May 2000, vol. 2, Issue 2-3, pp. 245-275.

(56) References Cited

OTHER PUBLICATIONS

Srihari, Rohini K. "Automatic indexing and content-based retrieval of captioned images" Computer 0 (1995): 49-56.
Stolberg et al ("Hibrid-Soc: a Multi-Core Soc Architecture for Multimedia Signal Processing" 2003).
Stolberg et al., "Hibrid-Soc: a Mul Ti-Core Soc Architecture for Mul Timedia Signal Processing", 2003 IEEE, pp. 189-194.
Theodoropoulos et al, "Simulating Asynchronous Architectures on Transputer Networks", Proceedings of the Fourth Euromicro Workshop On Parallel and Distributed Processing, 1996. PDP '96, pp. 274-281.
Vallet et al ("Personalized Content Retrieval in Context Using Ontological Knowledge" Mar. 2007) (Year: 2007).
Verstraeten et al, "Isolated word recognition with the Liquid State Machine: a case study", Department of Electronics and Information Systems, Ghent University, Sint-Pietersnieuwstraat 41, 9000 Gent, Belgium, Available onlline Jul. 14, 2005, pp. 521-528.
Wang et al., "Classifying Objectionable Websites Based onImage Content", Stanford University, pp. 1-12.
Ware et al, "Locating and Identifying Components in a Robot's Workspace using a Hybrid Computer Architecture" Proceedings of the 1995 IEEE International Symposium on Intelligent Control, Aug. 27-29, 1995, pp. 139-144.
Whitby-Strevens, "The transputer", 1985 IEEE, pp. 292-300.
Wilk et al., "The Potential of Social-Aware Multimedia Prefetching on Mobile Devices", International Conference and Workshops on networked Systems (NetSys), 2015, pp. 1-5.
Yanagawa et al, "Columbia University's Baseline Detectors for 374 LSCOM Semantic Visual Concepts", Columbia University ADVENT Technical Report # 222-2006-8, Mar. 20, 2007, pp. 1-17.
Yanagawa et al., "Columbia University's Baseline Detectors for 374 LSCOM Semantic Visual Concepts", Columbia University ADVENT Technical Report #222, 2007, pp. 2006-2008.

\* cited by examiner

DRIVING POLICIES DETERMINATION

RELATED APPLICATION INFORMATION

The present application claims the benefit of priority from U.S. Provisional Patent Application Ser. No. 62/530,215, filed on Jul. 9, 2017 which is incorporated herein in its entirety.

TECHNICAL FIELD

The present disclosure generally relates to the orchestration of a plurality of deep learning networks coupled in an adaptively reconfigurable grid.

BACKGROUND

The reduction of multiple symbols arranged in a pattern (intentionally or seemingly randomly) to a smaller number of manageable symbols that are easily recognizable is known in the art. For example, in music, a sequence of notes may be combined into two or more notes to form a chord that is played, or otherwise heard as if being played simultaneously. Chords tend to be repetitive in nature such that the plurality of notes may be represented by a single chord symbol, thereby reducing the number of notes explicitly represented in a musical score. Accordingly, the chord, "C7", is interpreted as the root note A, the minor third C, and a perfect fifth E to be played generally simultaneously.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the disclosure will be apparent from the following detailed description taken in conjunction with the accompanying drawings.

DETAILED DESCRIPTION

Overview

A method for responding to a query is implemented on at least one computing device and includes: receiving at least one query from a user device; determining a context for the at least one query, selecting at least one deep learning network (DLN) of a plurality of DLNs to process the at least one query, where the selecting is based at least on matching the context to the at least one DLN, sending at least a representation of the at least one query and the context to the at least one DLN, receiving at least one response to the at least one query from the at least one DLN, and sending the at least one response to the user device.

Description of Embodiments

It will be appreciated that patterns of data are typically distributed unevenly in a given population of data. Some patterns may be more prominent than others and are therefore likely to have a larger number of occurrences, while other patterns may be comparatively rare. In addition, some patterns may be correlated to each other, and together form pattern-combinations which may also be very common. This may be problematic for pattern recognition systems. For example, to retrieve a similarity measurement between two content-segments, it may not be enough to consider the number of corresponding patterns; the probability of occurrence for each pattern may be of importance as well. Furthermore, correlations between patterns may also be of importance. For example, if two patterns always appear together, it may be more efficient to consider them to be a single pattern.

It will be appreciated that the issues discussed hereinabove may negatively impact on the scalability and the accuracy of pattern-recognition systems. For example, in a large system where the handling of different patterns is typically spread among multiple resources (e.g., "machines") of the pattern-recognition system, machines configured to process "less-popular" patterns may remain largely inactive, whereas machines processing "popular" patterns, may be overloaded. It also may not be possible to distribute the handling of patterns according to their a-priory probability without knowledge of the correlations between the patterns. Furthermore, to scale up a pattern-recognition system in an efficient manner it may be beneficial to avoid duplication of the pattern-space and the need to store copies of each of the known patterns in each machine.

Figure 1:
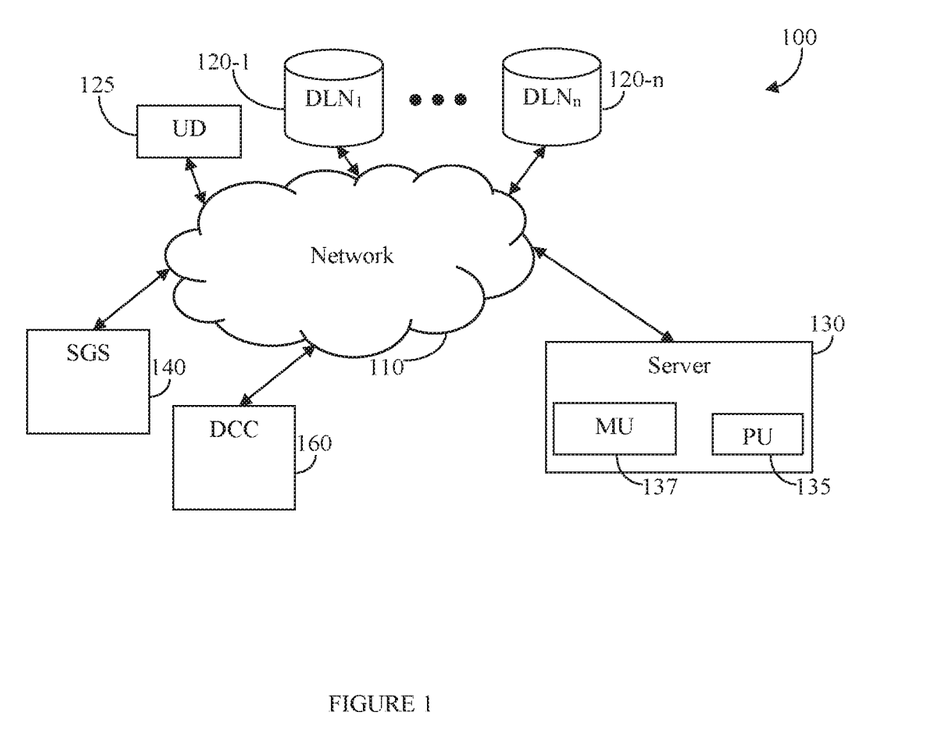
FIG. 1 is a schematic diagram of a deep learning system, constructed and operative in accordance with embodiments described herein.

Reference is now made to FIG. 1 which is an exemplary and non-limiting schematic diagram of a deep learning system 100 in accordance with embodiments described herein. System 100 may be configured to provide responses to queries. The queries may include sensory inputs, such as, for example, audio elements, visual elements, etc. The audio and visual elements may be provided, for example, as multimedia content elements (MMCEs), e.g., images, graphics, video streams, video clips, audio streams, audio clips, video frames, photographs, images of signals (e.g., spectrograms, phasograms, scalograms, etc.), and/or combinations thereof and portions thereof.

System 100 comprises a network 110, a plurality of deep learning networks (DLNs) 120, and a query server 130. Network 110 may be used to communicate between different parts of system 100, and may be implemented using the Internet, the world-wide-web (WWW), a local area network (LAN), a wide area network (WAN), a metro area network (MAN), and/or any other network(s) capable of enabling communication between the elements of the system 100.

Deep learning networks (DLNs) 120-1 through 120-$n$ may represent a plurality of networks providing deep learning services to query server 130. It will be appreciated that deep learning as referred to herein is an application of learning tasks of artificial neural networks (ANNs) that contain a plurality of layers by a computing device. To date, deep learning has been applied to fields including computer vision, speech recognition, natural language processing, audio recognition, social network filtering, machine translation and bioinformatics, producing results comparable to, and in some cases superior to, human experts. Deep learning typically uses a cascade of many layers of nonlinear processing units for feature extraction and transformation. Each successive layer uses the output from a previous layer as input. The algorithms may be supervised or unsupervised and applications may include both unsupervised pattern analysis and supervised classification. Deep learning further enables learning of multiple levels of representations that correspond to different levels of abstraction. The levels identified in such manner may represent a hierarchy of concepts.

Query server 130 comprises a processing unit (PU) 135 and a memory unit (MU) 137. Processing unit 135 may be instantiated as processing circuitry comprising one or more hardware logic components and circuits. For example, and without limitation, illustrative types of hardware logic components that may be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, and/or any other hardware logic components capable of performing calculations and/or other manipulations of information. In accordance with embodiments described herein, processing unit 135 may be implemented as an array of at least partially statistically independent computational cores. The properties of each computational core may be set independently of those of each other core, as described further hereinbelow. Memory unit 137 contains therein a query application instantiated as instructions that when executed by processing unit 135 configures query server 130 to perform as further described herein.

Query server 130 also includes a network interface (not shown) for connectivity to DLNs 120 via network 110. In accordance with embodiments described herein, query server 130 is configured to manage DLNs 120 and to optimize their use in providing responses to queries. For example, query server 130 may generate queries and send them to one or more DLNs 120. Query server 130 may then analyze responses and associated metadata received from the DLNs 120 to improve the use and configuration of DLNs 120 with respect to specific types of queries.

As depicted in FIG. 1, user device (UD) 125 is further coupled to the network 110. User device 125 may be, for example, a personal computer (PC), a personal digital assistant (PDA), a mobile phone, a smart phone, a tablet computer, an electronic wearable device (e.g., glasses, a watch, etc.), a smart television, or another wired or mobile appliance equipped with browsing, viewing, capturing, storing, listening, filtering, and managing capabilities enabled as further discussed herein below. It will be appreciated that for the sake of simplicity only one user device 125 is depicted in FIG. 1. However, the embodiments described herein may also support a plurality of user devices 125 that may communicate with query server 130 via network 110.

Each such user device 125 may comprise a software application (not shown) installed thereon to be executed by processing circuitry (not shown). The software application (app) may be downloaded from an application repository, such as the AppStore®, Google Play®, or any other similar repositories hosting software applications. Alternatively, the application may be pre-installed in user device 125. In accordance with some embodiments described herein, the application may be located on a remote server (e.g., in a cloud, or otherwise accessible via local or wide area network) and accessed by a web-browser application on user device 125. User device 125 may employ the application to send queries via network 110 to be analyzed by one or more of DLNs 120.

In accordance with some embodiments described herein, system 100 may also comprise a data warehouse (not shown) that is configured to store metadata associated with DLNs 120. The data warehouse may also be further configured to store queries received from user device(s) 125 and associated responses received thereof from DLNs 120. Per the exemplary embodiment of FIG. 1, query server 130 may communicate with the data warehouse through network 110. Such communication may be subject to an approval to be received from the user device 125.

In the exemplary embodiment of FIG. 1, system 100 may also comprise a signature generator system (SGS) 140 and a deep-content classification (DCC) system 160 which may be utilized by query server 130 to perform various functions as described herein. SGS 140 and DCC system 160 may be connected to query server 130 either directly or through network 110. Alternatively, DCC system 160 and/or SGS 140 may be embedded in query server 130. In accordance with one embodiment, query server 130 may also be configured with, or at least in communication with, an array of computational cores configured as discussed in more detail hereinbelow.

According to an embodiment described herein, query server 130 may be configured to receive at least one query from user device 125 over network 110. Query server 130 may analyze a query received from user device 125 to determine an optimal, or at least a preferred DLN 120 to process the query. In accordance with some embodiments described herein, query server 130 may invoke SGS 140 to generate at least one signature to be associated with the query. In accordance with some embodiments described herein, the process employed by SGS 140 to generate the signature(s) may employ lossless compression of at least part of the element(s) of the query, thereby rendering the generated signature(s) robust to noise and distortions.

DCC system 160 may comprise a database of query identifiers and query classifications. Query server 130 may use the signature as a query identifier to search for a similar query in DCC system 160. Based on this search, DCC system 160 may return a query classification to query server 130. For example, a signature representing a man with a basketball may be classified as representing "basketball."

Alternatively, or in addition, the signature may be used to search for a concept structure (or concept) in DCC system 160. A concept is a collection of signatures representing elements of the unstructured data and metadata describing the concept. As a non-limiting example, a 'Superman concept' is a signature-reduced cluster of signatures describing elements (such as multimedia elements) related to, e.g., a Superman cartoon: a set of metadata representing proving textual representation of the Superman concept. Techniques for generating concept structures are also described in U.S. Pat. No. 8,266,185 (hereinafter '185) to Raichelgauz et al., which is assigned to common assignee, and is incorporated hereby by reference for all that it contains.

For example, user device 125 may provide one or more MMCEs as a query to query server 130, e.g., an image of a basketball player. Query server 130 may invoke SGS 140 to generate at least one signature for each of the MMCEs in the query. The signature(s) may then be used to search DCC system 160 to identify an associated concept. The metadata in the identified concept may be used to identify a context for each of the plurality of MMCEs using each of the generated signatures. For example, for the image of basketball player, the concept may be "basketball", and the keyword "basketball" may be included in the metadata for the concept. If the query also includes a second image, e.g., the logo for the National Basketball Association (NBA), the second concept may be "NBA", and the keyword "NBA" may be included in the concept's metadata. In such an example, the context may be derived from the two concepts, yielding "NBA basketball." An exemplary technique for determining a context of multimedia elements based on signatures is described in detail in U.S. patent application Ser. No. 13/770,603, filed on Feb. 19, 2013, assigned to common assignee, which is hereby incorporated by reference for all the useful information it contains.

It will be appreciated that the embodiments described herein are not necessarily limited to the use of signatures to determine a query's context. In accordance with some embodiments, the query may include text in addition to, or instead of, one or more images. For example, the query may include the names of basketball players from the NBA. The names may be used to search DCC system 160 to identify the associated concept, e.g., "NBA basketball."

It will be appreciated that DLNs 120 may not be configured identically. Some deep learning models have comparative advantages vis-à-vis other deep learning models for given subjects of interest. For example, some deep learning models may be observed to provide better results for face detection, whereas other deep learning models may be observed to provide better results for facial recognition (given a detected face). And even among deep learning models that provide better results for facial recognition, there may be differences in the quality of results based on ethnicity and/or other factors. It will similarly be appreciated that for practical reasons (e.g., cost/efficiency, resource availability, etc.) the DLNs 120 may be implemented with different levels of computing resources, e.g., RAM, CPU, bandwidth, etc. DLNs 120 may use large amounts of reference data; it may not be practical or efficient to store the entire universe of relevant data on each machine. Furthermore, at any given time, based on previous assignments of queries to perform, the different DLNs 120 may have different levels of resources available to perform additional queries. It will be appreciated that in operation there may be other factors differentiating between the suitability of the DLNs 120 to perform a given query.

In accordance with embodiments described herein, query server 130 may comprise a list of the various DLNs 120 that may include ratings for different contexts, tasks, and processing capabilities. The list and ratings may be based on a pre-processing analysis of actual performance and/or manual input. The ratings may represent the suitability of a given DLN 120 to perform a query in a given context in terms of processing speed and/or accuracy. Query server 130 may also track current workloads for each DLN 120 based on, for example, queries assigned to a given DLN 120 for which a response has not yet been received. Query server 130 may calculate a current processing load for each DLN 120 as a function of current workload and computing resources.

Query server 130 may be configured to use at least the identified context to select at least one DLN of the plurality of DLNs 120 that optimally serves the query in light of the relevant comparative advantages (e.g. per the rating) and current workload as described hereinabove. For example, for a query based on an image of an unknown girl, query server 130 may select a DLN 120 based on its rating for facial recognition. For a crowd scene, query server 130 may split the query into two stages: for the first stage a DLN 120 may be selected based on its rating for face detection; for the second stage a DLN 120 may be selected based on its rating for facial recognition, where the faces detected by the first DLN 120 may be provided (either directly or via query server 130) for further analysis to the second DLN 120. For a crowd scene with an identified context of "Hong Kong," the DLN 120 selected for facial recognition may be selected based on a higher rating for facial recognition among people of Asian ancestry.

Depending upon the configuration of system 100, the selected DLN 120 may return a response for the query to Query server 130 which may in turn forward the response to user device 125. Alternatively, or in addition, the selected DLN 120 may return the response directly to user device 125. In a case where there may be a plurality of outputs (e.g., from more than one DLN 120), query server 130 may cluster the outputs to a single complex output in order to optimally serve the query response. Alternatively, the plurality of outputs may be prioritized and formatted individually by query server 130 before providing the results to user device 125.

Figure 2:
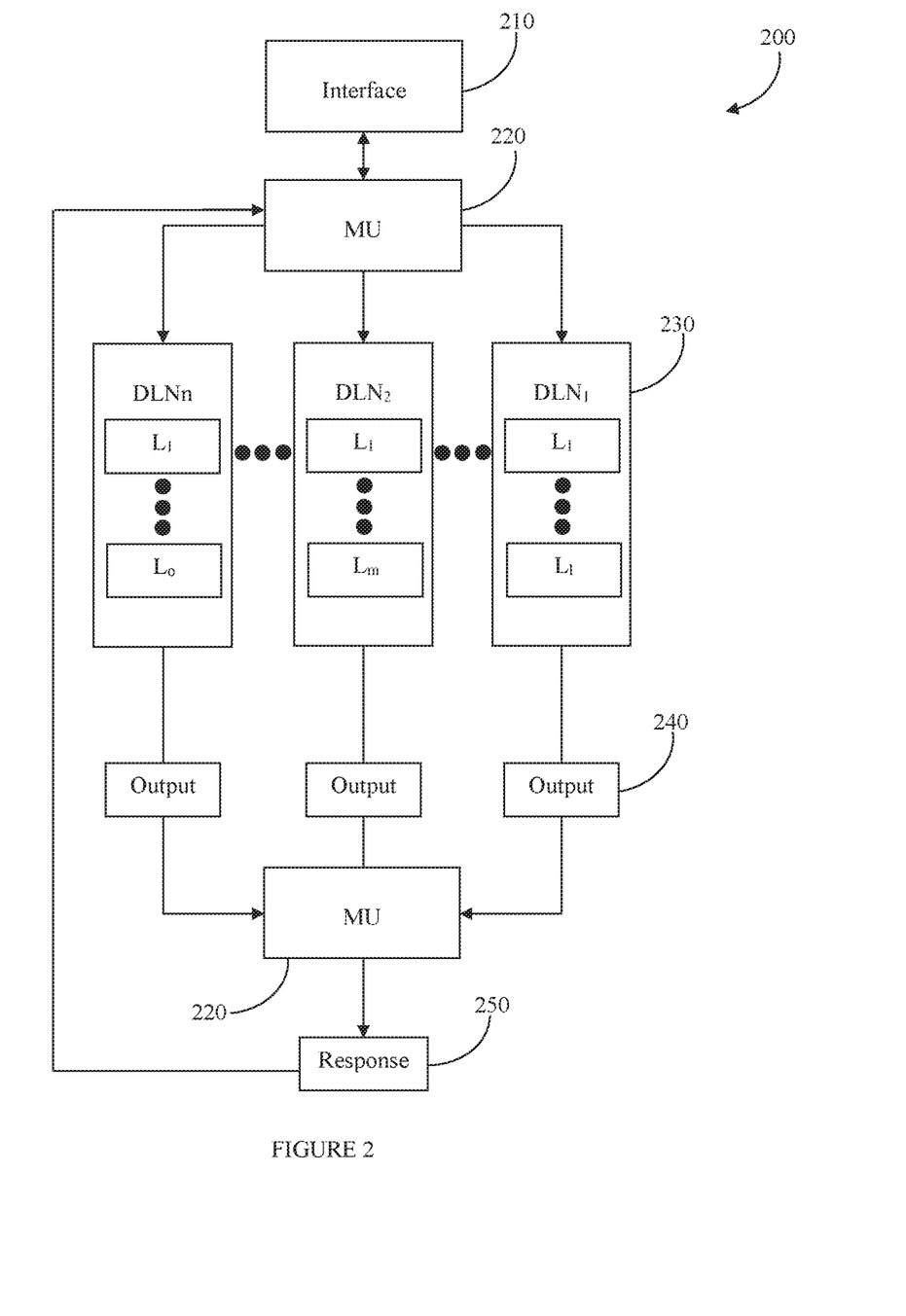
FIG. 2 is a schematic diagram of a deep learning networks' reconfigurable grid architecture, constructed and operative in accordance with embodiments described herein.

FIG. 2 depicts an exemplary and non-limiting schematic diagram of deep learning networks' reconfigurable grid architecture 200 according to an embodiment. An interface 210 is operative to receive requests from query server 130 (FIG. 1) for analyzing at least one query. The requests may include metadata associated with the query generated by query server 130 based on an analysis of the query. The metadata may include, for example, a selection of one or more DLNs (labelled herein as DLNs 230), a selection of type of DLNs 230, signatures associated with the query, concepts and/or contexts associated with the query, etc.

Thereafter, the request may be forwarded to a management unit (MU) 220 that is configured to navigate the request throughout the plurality of DLNs 230 (only one labeled in FIG. 2 for the sake of simplicity). Each DLN 230 comprises a plurality of layers ($L_1$ etc.) therein. Thereafter, an output 240 (only one labeled in FIG. 2 for the sake of simplicity) may be generated by the one or more selected DLNs 230 and sent to MU 220 It will be appreciated that MU 220 may be depicted twice in FIG. 2 for the sake of simplicity in representation of the flow architecture 200). MU 220 is operative to generate response 250 based on the one or more outputs. Interface 210 is operative to return response 250 to query server 130 and/or directly to user device 125.

Figure 3:
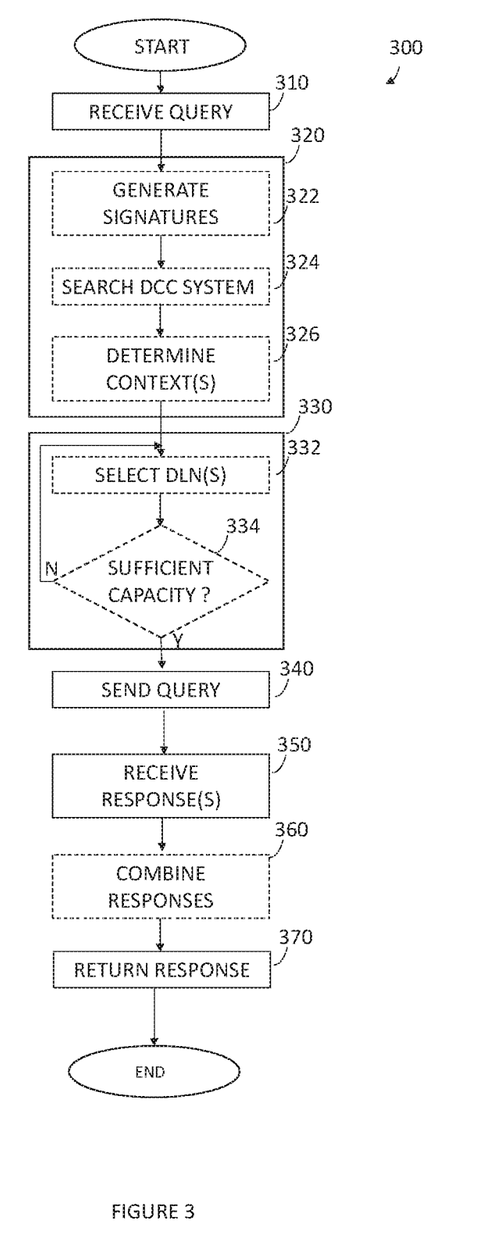
FIG. 3 is a flowchart of a process for optimally responding to a query via a deep learning networks' exchange platform according to embodiments described herein.

FIG. 3 depicts an exemplary and non-limiting flowchart 300 describing an operation of an exemplary method performed by query server 130 (FIG. 1) for optimally orchestrating deep learning system 100 (FIG. 1) in response to a query. Query server 130 (FIG. 1) may receive (step 310) at least one query as input from user device 125 (FIG. 1). A query may include at least one sensory input, such as, for example, an audio and/or visual multimedia content element. The multimedia content element may be, for example, an image, a graphic, a video stream, a video clip, an audio stream, an audio clip, a video frame, a photograph, and an image of signals (e.g., spectrograms, phasograms, scalograms, etc.), and/or combinations thereof and portions thereof.

Query server 130 may determine (step 320) a context for the query. In accordance with some embodiments described herein, step 320 may comprise query server 130 generating (step 322) a signature for at least one multimedia content element in the query; using the generated signature(s) to search (step 324) DCC 160 (FIG. 1) for a concept associated with the at least one multimedia content element; and determining (step 326) a context based on the concept(s) associated with each of the multimedia content elements in the query. Alternatively, or in addition, step 320 may comprise looking up one or more keywords from the query in DCC 160 to determine the context.

Based at least on the determined context, query server 130 may select (step 330) one or more DLNs 120 (FIG. 1) to perform the query. In accordance with some embodiments described herein, step 330 may comprise query server 130 selecting (step 332) one or more DLNs 120 based on their associated ratings for processing queries with the determined context(s). Query server 130 may then check for sufficient processing capacity (step 334) on the selected DLN(s), e.g., according to current processing load. If one or more DLNs 120 does not have sufficient processing capacity, control may return to step 332 where a different DLN 120 may be selected, e.g., the DLN 120 with the next highest rating for the determined context. Otherwise processing may continue to step 340.

Query server 130 may send (step 340) the query to the selected DLN(s) 120, and subsequently receive (step 350) the query response(s) from the selected DLN(s) 120 after the query is processed. It will be appreciated that depending on the configuration of system 100, the query as sent to DLN (s) 120 may not necessarily be identical to the query as received from user device 125, but rather a representation of the original query. For example, the query sent in step 340 may include one or more MMCEs from the query received from user device 125, one or more signatures derived from the MMCE(s), and/or the context(s) as determined in step 326. If necessary, query server 130 may combine (step 360) multiple responses into a single combined response. Query server 130 may then return (step 370) the (combined) response(s) to user device 125.

In accordance with some embodiments described herein, query server 130 may be configured to adjust the ratings for DLNs 120 in accordance with the results of process 300. For example, if the actual response to receive a query response from a given DLN 120 is slower/faster than anticipated as per its current rating for the associated context, query server 130 may adjust the rating accordingly. Similarly, in some implementations, query server 130 may be configured with a feedback mechanism to receive feedback from user device 125 regarding the usefulness of the query responses received in process 300. Query server 130 may also be configured to adjust an associated rating in accordance with the feedback.

It is important to note that the embodiments disclosed herein are only examples of the many advantageous uses of the teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein may be implemented as hardware, firmware, software, or any combination thereof. Moreover, the software is preferably implemented as an application program tangibly embodied on a program storage unit or computer readable medium consisting of parts, or of certain devices and/or a combination of devices.

The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code.

The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the disclosed embodiments and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for responding to a query, the method implemented on at least one computing device and comprising:
receiving at least one query from a user device;
determining a context for said at least one query;
selecting at least one deep learning network (DLN) of a plurality of DLNs to process said at least one query, wherein said selecting is based at least on matching said context to said at least one DLN;
sending at least a representation of said at least one query and said context to said at least one DLN;
receiving at least one response to said at least one query from said at least one DLN; and
sending said at least one response to said user device.

2. The method according to claim 1 wherein said at least one query includes at least one multimedia content element (MMCE), and the method further comprises: using at least one identifier associated with said at least one MMCE to search a deep content classification system for at least one concept associated with said at least one MMCE; and determining said context according to metadata associated with said at least one concept.

3. The method according to claim 2 wherein: said at least one identifier is at least one signature derived from said at least one MMCE; and said concept is a collection of associated signatures and metadata.

4. The method according to claim 2 wherein said at least one identifier is metadata associated with said MMCE.

5. The method according to claim 1 wherein said at least one query includes at least text, and the method further comprises: using said at least text to search a deep content classification system for at least one concept associated with said at least text; and determining said context according to metadata associated with said at least one concept.

6. The method according to claim 1 further comprising: determining a current processing load for each of said plurality of DLNs, wherein said selecting is further based on said current processing load, the determining of the current processing load is based on pending queries for each DLN of the plurality of DLNs.

7. The method according to claim 1 wherein said at least one DLN is at least two DLNs.

8. The method according to claim 7 wherein said receiving at least one response comprises: receiving said at least one response from each of said at least two DLNs; and combining said at least one response from each of said at least two DLNs into a combined response, wherein said sending said at least one response comprises sending said combined response to said user device.

9. The method according to claim 7 wherein said receiving at least one response comprises: receiving a first response from one of said at least two DLNs; sending at least said first response as part of said at least one query to another DLN from said at least two DLNs; and receiving a second response from said another DLN, wherein said sending said at least one response comprises sending said second response to said user device.

10. The method according to claim 1 further comprising rating each of said plurality of DLNs for performance of queries associated with a plurality of contexts, wherein: said context is determined from among said plurality of contexts; and said selecting is further based at least on said rating.

11. The method according to claim 1 wherein the selecting is also based on ratings of said plurality of DLNs for responding to queries associated with said context.

12. The method according to claim 11 wherein the ratings reflect accuracies of responses of the said plurality of DLNs to queries associated with said context.

13. The method according to claim 11 wherein the ratings reflect processing speed of the said plurality of DLNs when responding to queries associated with said context.

14. The method according to claim 11 wherein the ratings are calculated based on analysis of performances of said plurality of DLNs.

15. The method according to claim 11 comprising updating a rating of a DLN of the plurality of DLNs, based on a response of said DLN to the at least one query.

16. The method according to claim 15 wherein the updating is responsive to a processing speed of the DLN.

17. The method according to claim 15 wherein the updating is responsive to feedback from the user to the response of said DLN to the at least one query.

18. The method according to claim 11 wherein the query comprises an image of one or more persons located at a certain geographical location, wherein the context reflects an expected ethnicity of the one or more person at the certain geographical location, and wherein the ratings of the plurality of DLNs reflect face recognition accuracies of the DLNs given the expected ethnicity.

19. The method according to claim 1 wherein the at least two of said plurality of DLNs differ from each other by levels of computing resources.

20. The method according to claim 1 wherein the selecting of the at least one DLN comprises selecting a first DLN to provide a first response, and selecting a second DLN to process the second response to provide a second response.

21. The method according to claim 20 wherein the first DLN is configured to provide face detection results of better quality than the second DLN, and wherein the second DLN is configured to provide face recognition results of batter quality that the first DLN.

22. A deep learning system comprising:
a plurality of deep learning networks (DLNS) instantiated on at least one computing device;
a query server instantiated on a computing and operative to:
receive at least one query from a user device,
determine a context for said at least one query,
select at least one DLN of said plurality of DLNs to process said at least one query, wherein said query server is operative to select said at least one based at least on matching said context to said at least one DLN,
send at least a representation of said at least one query and said context to said at least one DLN,
receiving at least one response to said at least one query from said at least one DLN, and
send said at least one response to said user device.

* * * * *